UNITED STATES PATENT OFFICE.

MYRTIL KAHN AND ANTON OSSENBECK, OF ELBERFELD, GERMANY, ASSIGNORS TO FARBENFABRIKEN VORM. FRIEDR. BAYER & CO., OF ELBERFELD, GERMANY, A CORPORATION OF GERMANY.

DYE-BATH.

1,060,097. Specification of Letters Patent. Patented Apr. 29, 1913.

No Drawing. Original application filed December 26, 1911, Serial No. 667,664. Divided and this application filed March 20, 1912. Serial No. 685,011.

*To all whom it may concern:*

Be it known that we, MYRTIL KAHN and ANTON OSSENBECK, doctors of philosophy, chemists, citizens of the German Empire, residing at Elberfeld, Germany, have invented new and useful Improvements in Dye-Baths, of which the following is a specification.

The present application is a divisional application of our application No. 667,664, filed December 26, 1911, and concerns the production of brown to black fast shades on wool which can be obtained by dyeing according to the one-bath method the azo dyes obtained from nitro-2-aminophenols and beta-naphthol on wool in the presence of a chrome mordant.

In order to illustrate the new process more fully the following example is given, the parts being by weight:—Prepare the dye-bath with 4 per cent. of the dye: 6-chloro-4-nitro-2-aminophenol + beta-naphthol, bring to the boil, add 2 per cent. of potassium bichromate, enter the wool at 60–80° C., bring to the boil, boil during ¾ hours and add slowly 2–3 per cent. of acetic acid and continue boiling for 1–1½ hours. A deep dark brown fast shade is thus obtained, fast to light, fulling and rubbing.

Another chrome compound or another of the above mentioned dyes can be used *e. g.* dyes obtained from beta-naphthol and 4-nitro-2-aminophenol, nitro-amino-ortho-cresol, 5- or 6-nitro-4-chloro-2-aminophenol or nitro-amino-para-cresol.

We claim:—

1. An acid dye-bath comprising an unsulfonated azo dye obtained from beta-naphthol and a nitro-2-aminophenol and a chrome mordant, substantially as described.

2. An acid dye-bath comprising an unsulfonated azo dye obtained from beta-naphthol and a nitro-2-aminophenol and potassium bichromate, substantially as described.

3. An acid dye-bath comprising the azo-dye: 6-chloro-4-nitro-2-aminophenol-azo-beta-naphthol and a chrome mordant, substantially as described.

4. An acid dye-bath comprising the azo-dye: 6-chloro-4-nitro-2-aminophenol-azo-beta-naphthol and potassium bichromate, substantially as described.

In testimony whereof we have hereunto set our hands in the presence of two subscribing witnesses.

MYRTIL KAHN. [L. S.]
ANTON OSSENBECK. [L. S.]

Witnesses:
HELEN NUFER,
A. NUFER.